E. R. CARICHOFF.
ELECTROMAGNETIC SWITCH.
APPLICATION FILED NOV. 7, 1914. RENEWED MAR. 11, 1918.
1,280,661.
Patented Oct. 8, 1918.
2 SHEETS—SHEET 2.
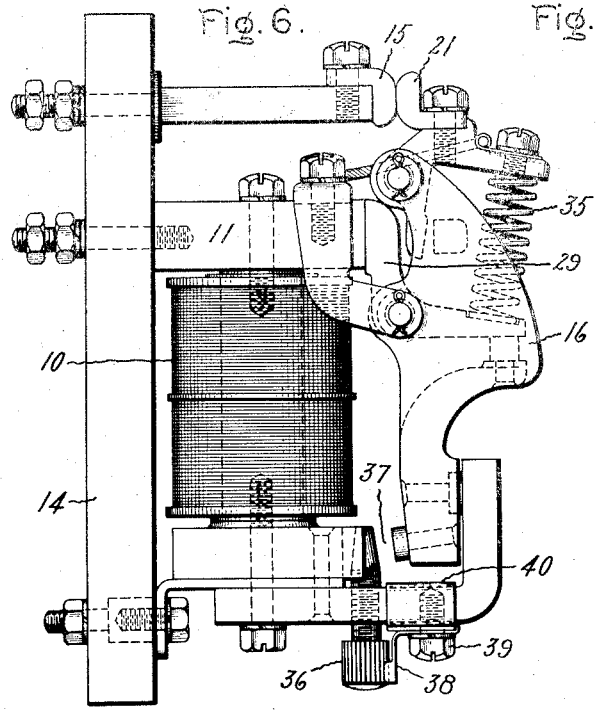
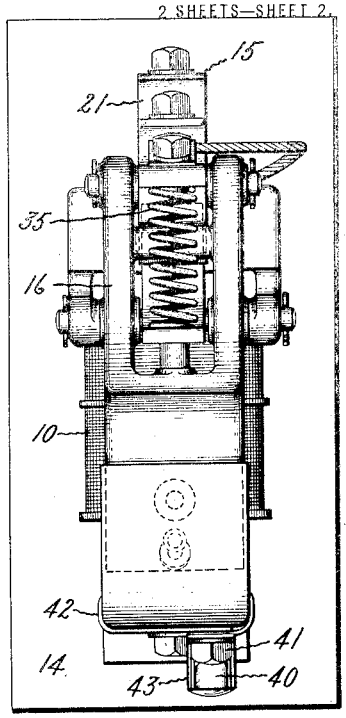
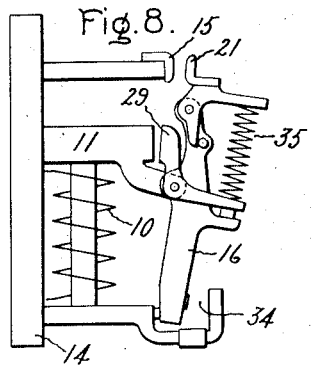
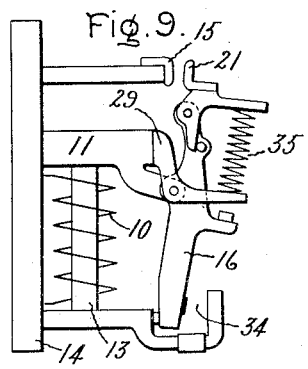
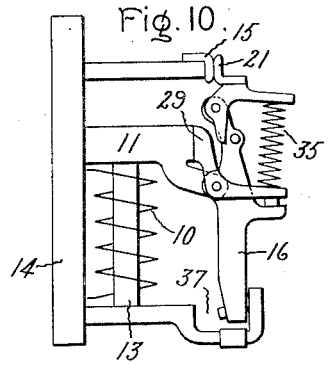
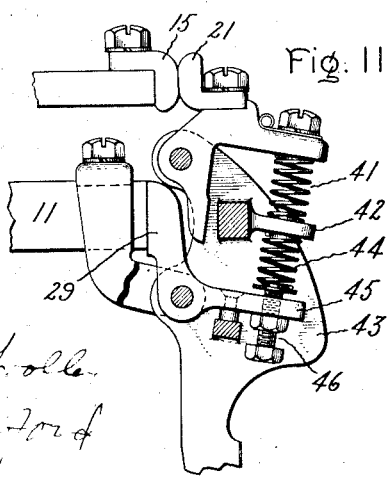
WITNESSES:
INVENTOR:
EUGENE R. CARICHOFF,
BY
HIS ATTORNEY.

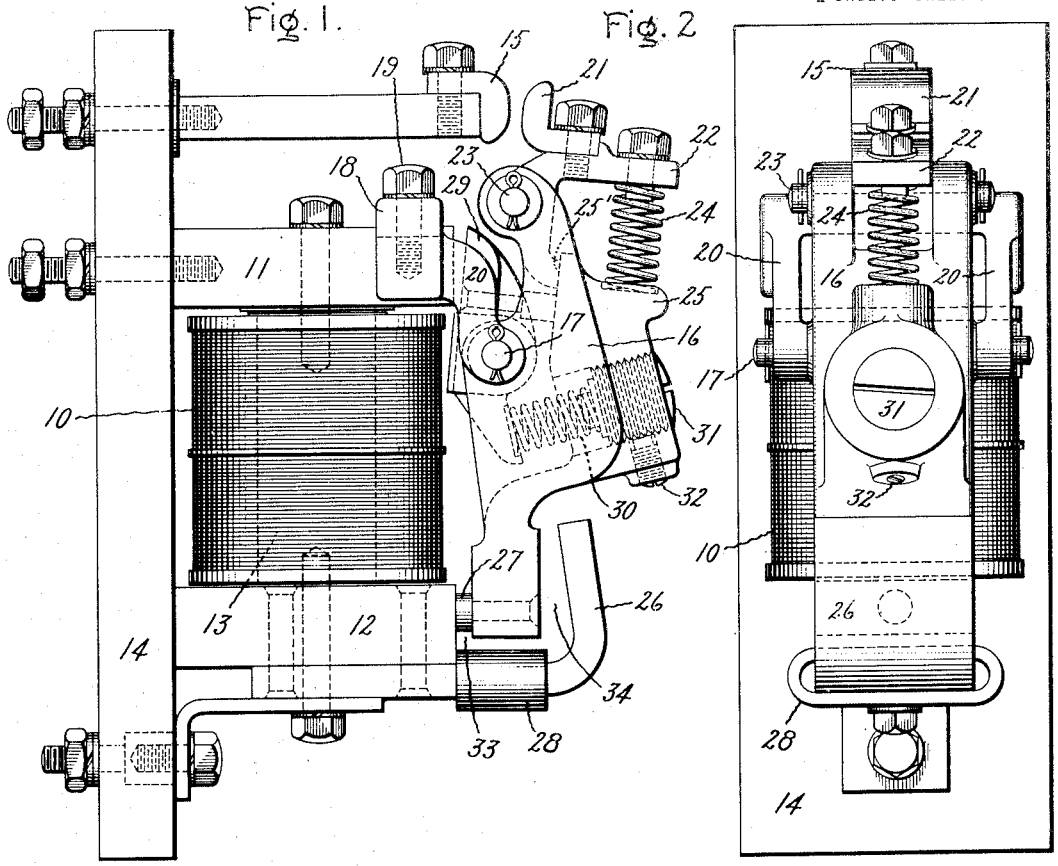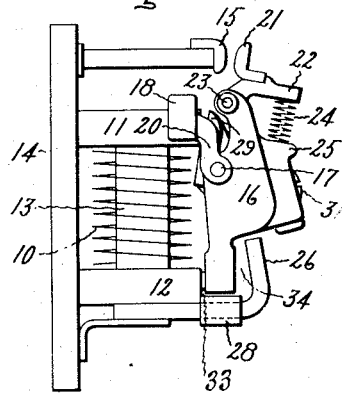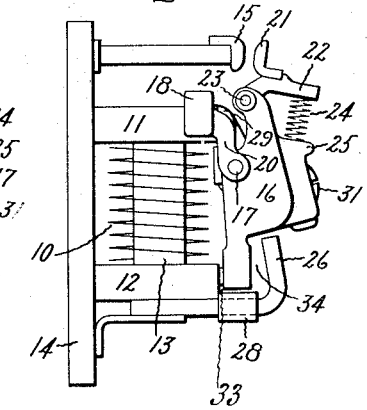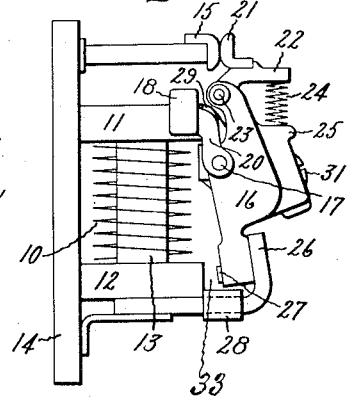

UNITED STATES PATENT OFFICE.

EUGENE R. CARICHOFF, OF SCHENECTADY, NEW YORK, ASSIGNOR TO GENERAL ELECTRIC COMPANY, A CORPORATION OF NEW YORK.

ELECTROMAGNETIC SWITCH.

1,280,661.   Specification of Letters Patent.   Patented Oct. 8, 1918.

Application filed November 7, 1914, Serial No. 870,807. Renewed March 11, 1918. Serial No. 221,868.

*To all whom it may concern:*

Be it known that I, EUGENE R. CARICHOFF, a citizen of the United States, residing at Schenectady, county of Schenectady, State of New York, have invented certain new and useful Improvements in Electromagnetic Switches, of which the following is a specification.

This invention relates to electromagnetic switches for the control of electric circuits and has for its object the provision of improved means whereby an electric circuit may be controlled in a reliable, simple and efficient manner.

My invention relates more specifically to electromagnetic switches for controlling electric motor circuits, one of the objects being to provide a device of this character which will effect the automatic starting of the motor under the control of the motor current. In the operation of electric motors it is common to both start the motor and control its speed by means of a resistance which is cut in and out of circuit. Every time a section of resistance is cut out the current temporarily rises above normal value. The increase in speed which is caused by the cutting out of the section of resistance immediately reduces the current. During the starting of the motor, therefore, there is a temporary rush of current for each section of resistance which is cut out. These sections are frequently cut out of circuit by electromagnetic switches which operate automatically in succession. In order to prevent the switches from operating too rapidly and increasing the current beyond a safe value, various means have been devised. An ideal switch for this purpose is one containing a winding which carries the motor current and a switch member controlled thereby for cutting out the resistance, the arrangement being such that the switch member will not be operated to cut out the resistance until the current has fallen to a predetermined value and will assume an open position when the winding is deenergized. A switch of this character was invented by Walter O. Lum and forms the subject matter of an application, Serial No. 611,151, filed February 27, 1911, assigned to the same assignee as this application.

My present invention is in the nature of an improvement upon the device covered by the said application. Among the novel features of the switch constituting these improvements are the improved magnetic circuit which lends efficiency to the device and makes it more accurate and positive in operation; also the improved mechanical construction which renders the switch more rugged and compact and lessens the cost of production. The specific features of novelty will appear in the course of the following specification and appended claims.

In the accompanying drawing illustrating one form of my invention, Figure 1 is a side elevation of a complete electromagnetic switch embodying my improvements; Fig. 2 is a front elevation of the same; Figs. 3, 4 and 5 show in outline the various positions which the switch assumes in operation; Figs. 6 to 10 show similar views of a modified form; and Fig. 11 shows a detail of a further modification.

Referring to Figs. 1 and 2, 10 represents an energizing winding for magnetizing the magnetic structure composed of an upper pole-piece 11 and a lower pole-piece 12 connected by a core 13. These parts, together with the winding 10 mounted upon the core, form an electromagnet which is secured to an insulating base 14. A fixed contact 15 is also secured to the insulating base adjacent the magnet so as to coöperate with the moving contact as hereinafter described. A switch member 16 is pivoted at 17 to the magnet frame. For this purpose a bracket 18, preferably of brass or other non-magnetic material, is secured to the pole-piece 11 by a screw 19, this bracket having arms 20 extending downward and outward from the pole-piece. The switch member 16 is elongated in shape and pivoted near its middle portion so that one end extends downward to coöperate with the pole-piece 12, while the other end extends upward toward the fixed contact 15. A contact 21 is mounted on the member 16 so as to coöperate with the fixed contact 15. These contacts are shaped so as to wipe or roll upon each other in a manner now well known in the art and to this end the contact 21 is mounted upon a bracket 22 pivoted at 23, there being a compression spring 24 interposed between the bracket and the projecting lug 25 on the switch member 16. A tail piece 25' is provided for the bracket 22 for limiting the movement of the bracket in response to the pressure of spring 24. The lower end of the switch member forms an armature which coöperates with the pole-piece 12 and also with an auxiliary pole-piece 26 secured to the pole-piece 12 and bent around as shown, so that the magnetic circuit through the auxiliary pole-piece is considerably longer than that through the pole-piece 12. The end of the switch member moves freely between the two pole-pieces. The switch member, with the parts attached thereto, is so pivoted and weighted that it normally assumes the position shown in Fig. 1, that is, it is biased to the open position with the lower end of the member against the pole-piece 12, but preferably spaced therefrom by a non-magnetic spacer 27. A band or sleeve 28 having low electrical resistance is preferably placed around the auxiliary pole-piece 26 as shown in order to delay the building up of the flux through this pole-piece, as hereinafter described.

Pivoted on the pivot 17 of the switch member, so as to move independently of the switch member, is a lever 29 of magnetic material. The upper end of this lever coöperates with the pole-piece 11 so as to be magnetically attracted thereby, while the lower end projects into the switch member 16; that is, it enters the space formed by the two webs of the member. Between the lower end of this lever 29 and the switch member proper is interposed a compression spring 30. This spring abuts against an adjusting screw 31 in the switch member, which screw is locked in various positions by locking screw 32. The arrangement is such that when the lever 29 is attracted by the pole-piece 11 and the switch member 16 is held in its normal position against the pole-piece 12, the spring 30 is compressed so as to give the switch member 16 a tendency to rotate on its pivot and bring the contact 21 into engagement with contact 15. This tendency to move the switch member is also increased by the magnetic attraction between the lower end of the switch lever and the auxiliary pole-piece 26.

As thus constructed and arranged, the operation of this switch will be as follows: Assuming that the winding 10 is energized by current above the value at which it is desired that the switch shall close, the switch member 16 will be held in open position as shown in Figs. 1 and 3. It will be held in this position by the magnetic pull across the gap 33 which will be called the holding out gap. The energizing of the winding causes the switch lever 29 to be attracted and the spring 30 to be placed under compression. The force tending to close the switch will now be due to the pressure of the spring 30 aided by the attraction across the gap 34, which will be called the closing gap. The arrangement is such, however, that the electromagnetic holding out force will be greater than the closing force. This adjustment of the forces is facilitated by the presence of the band 28, preferably of copper, which is traversed by a transient induced current of high value which momentarily opposes the increase in flux in the auxiliary pole-piece 26. This helps to prevent the switch from closing upon the initial rush of current, during which, of course, the current passes through the lower value at which it is intended that the switch should close. The parts will now be in the position shown in Fig. 4, in which the switch member is still in its normal position, but the lever 29 has been moved so as to compress the spring 30. The parts will remain in this position while the current is at its high value, but when the current is reduced to the predetermined value, at which the switch is designed to close, the switch member will move to the closed position shown in Fig. 5. This is due to the fact that as the current decreases the total flux decreases so that the pull across the holding out gap and also of course, the pull across the closing gap decreases while the force due to the compression of the spring remains constant. There must come a time, therefore, when the closing force, which includes a constant force, will overcome the holding out force which is decreasing. When the proper current value is reached the closing force overpowers the holding out force and as the switch member starts to move to closed position, the holding out gap 33 is increased while the closing gap 34 is decreased so that the magnetic closing force increases rapidly until it finally pulls the switch member against the pole-piece 26 and wipes the contacts 15 and 21 on to each other, as shown in Fig. 5.

The current value at which the switch closes may be adjusted over a wide range by turning the screw 31. If the screw is moved inward, the compression of the spring will be increased and the switch will close at a higher current value, and vice versa, if the screw is moved outward the switch will close at a lower current value. Upon a rush of current above the value at which the switch is adjusted to close, the switch will remain open but will close when the current drops to that value. Below the holding out value of the current the switch will operate as an ordinary electromagnetic switch, that is, it will close as soon as the winding is energized. In operating at these low current values the switch member and the lever 29 move as a unit to closed position.

It will be noted that in the closed position of the switch there is a closed magnetic circuit, since both the closing gap 34 and the gap between the pole-piece 11 and lever 29 are closed. The magnetic circuit through the closing gap is longer than that through the holding out gap, thereby delaying the maximum pulling effort at the closing gap. It will also be noticed that all the contacting surfaces are vertical so that no opportunity is afforded for the collection of foreign matter. The parts are all very accessible and easily removable, and the switch as a whole is exceedingly rugged and compact.

In Figs. 6 to 10 I have shown a modified form of my invention. This switch differs from that shown in Figs. 1 to 5 principally in the matter of details such as the arrangement of the spring and the method of adjustment. By referring to Figs. 6 to 10 it will be seen that there is only one spring 35 in place of the two springs in the switch shown in Figs. 1 to 5. This spring therefore serves two functions, viz., it causes the wiping action between the contacts 15 and 21 and also acts to give the switch a tendency to close when the winding is energized above a predetermined value. The use of the single spring, however, makes it desirable that the switch be adjusted by some means other than by the adjustment of the spring mentioned, since the adjustment of the spring affects the pressure between the contacts. One method of accomplishing this adjustment is shown in Fig. 6.

A screw 36 of magnetic material projects into the holding out air gap 37. This screw, which is shown in its highest position, has a tapered end. As this screw is moved back and forth in the gap the reluctance of the gap is varied so as to effect substantially the same result as is brought about by the adjustment of the spring in the switch shown in Figs. 1 to 5. The screw is locked in position by a clip 38 secured in place by a screw 39 which also passes through the copper sleeve 40.

The operation of this form of device is substantially the same as that shown in Figs. 1 to 5. In the normal position the parts will be in the position shown in Fig. 8. When the winding is energized above a predetermined value the armature 29 is attracted and the spring 35 placed under tension as shown in Fig. 9. When the current falls to a predetermined value the switch closes and the parts assume the position shown in Fig. 10.

Fig. 11 shows a further modification in which two springs are employed in a somewhat different way from the arrangement of Figs. 1 and 2. In this case the spring 41, which effects the wiping of the contacts, bears against a projection 42 on the switch member 43. The spring 44, which gives the switch arm a tendency to close, is interposed between the under side of the projection 42 and the lever 45. The result produced is about the same as that produced by the switch shown in Figs. 6 to 10. There is an advantage, however, in using the two springs in this way, in that the use of a long spring is avoided, and also the adjustment can be made by adjusting the tension of the spring instead of adjusting the air gap. This, it will be noticed, is done by a screw 46. Aside from this difference in the arrangement of the spring, the switch will operate in the same manner as that shown in the Figs. 6 to 10.

While I have described my invention as embodied in concrete form and as operating in a specific manner in accordance with the provisions of the patent statutes, it should be understood that my invention is not limited thereto, since various modifications thereof will suggest themselves to those skilled in the art without departing from the spirit of my invention, the scope of which is set forth in the annexed claims.

What I claim as new and desire to secure by Letters Patent of the United States, is,—

1. An electromagnetic switch comprising a magnetizing winding, a magnetic structure including a pivoted switch member normally in open position, and means whereby the switch member will be held in open position when the current is relatively high and moved to closed position when the current falls to a predetermined value, said means comprising a closing gap and a holding out gap in the magnetic circuit on one side of the pivot acting respectively to move the switch member to closed position and to hold it in open position, and an element movable with reference to the switch member by magnetic attraction across a gap on the opposite side of the pivot having means for giving the switch member a tendency to close in opposition to the holding out force.

2. An electromagnetic switch comprising a magnetizing winding, a magnetic structure including a pivoted switch member normally in open position, and means whereby the switch member will be held in open position when the current is relatively high and moved to closed position when the current falls to a predetermined value, said means comprising a closing gap and a holding out gap in the magnetic circuit on one side of the pivot acting respectively to move the switch member to closed position and to hold it in open position, and an element movable with reference to the switch member when the winding is energized having means for giving the switch member a tendency to close in opposition to the holding out force.

3. An electromagnetic switch comprising a magnetizing winding, a magnetic structure including a pivoted switch member normally in open position and means whereby the switch member will be held in open position when the current is relatively high and moved to closed position when the current falls to a predetermined value, said means comprising two pole-pieces coöperating with the switch member on one side of the pivot, one for holding the switch member open and the other for holding it closed, an element movable with reference to the switch member when the winding is energized, and a spring interposed between the element and the switch member to give the latter a tendency to close.

4. An electromagnetic switch comprising a magnetizing winding, a magnetic structure including a pivoted switch member normally in open position and means whereby the switch member will be held in open position when the current is relatively high and moved to closed position when the current falls to a predetermined value, said means comprising two pole-pieces coöperating with the switch member on one side of the pivot, one for holding the switch member open and the other for holding it closed, an element pivoted concentrically with said switch member to move relatively thereto when the winding is energized, and a spring interposed between said element and said switch member to give the latter a tendency to close.

5. An electromagnetic switch comprising a magnetizing winding, a magnetic structure including a pivoted switch member normally in open position, and means whereby the switch member will be held in open position when the current is relatively high and moved to closed position when the current falls to a predetermined value, said means comprising two pole-pieces coöperating with the switch member on one side of the pivot, one for holding the switch open and the other for holding it closed, and an element movable with reference to the switch member when the winding is energized having means for giving the switch member a tendency to close and operating to form a closed magnetic circuit through the switch member when the switch is closed.

6. An electromagnetic switch comprising a magnetizing winding, a magnetic structure including a pivoted switch member normally in open position, and means whereby the switch member will be held in open position when the current is relatively high and moved to closed position when the current falls to a predetermined value, said means comprising two pole-pieces coöperating with the switch member on one side of the pivot, one for holding the switch member open and the other for holding it closed, a pole-piece on the other side of said pivot, and an element movable with reference to the switch member by the magnetic attraction of said latter pole-piece having means for giving the switch member a tendency to close and operating to form a closed magnetic circuit when it closes.

7. An electromagnetic switch comprising a magnetizing winding, a magnetic structure including a pivoted switch member normally in open position, and means whereby the switch member will be held in open position when the current is relatively high and moved to closed position when the current falls to a predetermined value, said means comprising two pole-pieces coöperating with the switch member on one side of the pivot, one for holding it open and the other for holding it closed, a pole-piece on the other side of said pivot, an element pivoted concentrically with said switch member so as to be moved relatively thereto by the attraction of said latter pole-piece, and a spring interposed between the element and the switch member to give the latter a tendency to close.

8. An electromagnetic switch comprising a magnetizing winding, a magnetic structure including a switch member normally in open position, and means whereby the switch member will be held in open position when the current is relatively high and moved to closed position when the current falls to a predetermined value, said means comprising a closing gap and a holding out gap in the magnetic circuit acting respectively to move the switch member to closed position and to hold it in open position, an element movable with reference to said member when the winding is energized having means for giving the switch member a tendency to close in opposition to the holding out force, and means for momentarily opposing the increase in the flux through the closing gap.

9. An electromagnetic switch comprising a magnetizing winding, a magnetic structure including a switch member normally in open position, means whereby the switch member will be held in open position when the current is relatively high and moved to closed position when the current falls to a predetermined value, said means comprising a closing gap and a holding out gap in the magnetic circuit acting respectively to move the switch member to closed position and to hold it in closed position, the path for the flux through the closing gap being longer than that through the holding out gap, and an element movable with reference to said member when the winding is energized having means for giving the switch member a tendency to close in opposition to the holding out force.

10. An electromagnetic switch comprising a vertically disposed magnetic core, a magnetizing winding thereon, a vertically disposed pivoted switch member normally in open position, means whereby the switch member is held in open position when the current is relatively high and moved to closed position when the current falls to a predetermined value comprising a pole-piece having a vertical face at the upper end of said magnetic core, and two pole-pieces at the lower end spaced apart and also having vertical faces, an armature at the lower end of said switch member located in the space between the said two pole-faces and normally occupying a position nearer to one of them than to the other, a movable armature at the other end of said switch member coöperating with the pole-piece at that end of the magnetic core and movable independently of said switch member, and a spring interposed between said movable armature and said switch member.

11. An electromagnetic switch comprising a vertically disposed magnetic core, a magnetizing winding thereon, a vertically disposed pivoted switch member normally in open position and means whereby the switch member is held in open position when the current is relatively high and moved to closed position when the current falls to a predetermined value comprising a pole-piece having a vertical face at the upper end of said magnetic core, and two pole-pieces at the lower end spaced apart and also having vertical faces, an armature at the lower end of said switch member located in the space between the said two pole-faces and normally occupying a position nearer to one of them than to the other, a movable armature at the other end of said switch member coöperating with the pole-piece at that end of the magnetic core and movable independently of said switch member, a spring interposed between said movable armature and said switch member, and means for adjusting the tension of said spring to change the value of the current at which the switch member will move to closed position.

12. An electromagnetic switch comprising a vertically disposed magnetic core, a magnetizing winding thereon, a vertically disposed pivoted switch member normally in open position and means whereby the switch member is held in open position when the current is relatively high and moved to closed position when the current falls to a predetermined value comprising a pole-piece having a vertical face at the upper end of said magnetic core, and two pole-pieces at the lower end spaced apart and also having vertical pole-faces, an armature at the end of the member located in the space between said pole-faces and normally occupying a position nearer to one of them than to the other, an armature pivoted concentrically with said switch member and movable independently thereof by said upper pole-piece, and a spring interposed between said pivoted armature and said switch member.

In witness whereof I have hereunto set my hand this 6th day of November, 1914.

EUGENE R. CARICHOFF.

Witnesses:
BENJAMIN B. HULL,
WILLIAM G. GAUVREAU.